Patented Sept. 24, 1929

1,729,464

UNITED STATES PATENT OFFICE

JOHN WATTMANN, OF BERLIN, LANKWITZ, GERMANY

METHOD OF WELDING EXPOSED RAILS

No Drawing.   Application filed May 29, 1928, Serial No. 281,589, and in Germany June 4, 1927.

The invention relates to certain improvements in the welding of railway rails to avoid the heavy stresses due to temperature changes which cause expansion and contraction of the rails, the object being to weld the rails in continuous lengths, so that the stresses induced by the changes in temperature will be minimized.

While it is quite general practice to weld the rails of street railways together by fusion joints, which practice is feasible by reason of the fact that the rails are embedded in the road or street structure, the method has not been generally extended to long stretches of exposed rails or open tracks without the interposition of expansion joints at relatively frequent intervals, because such tracks, when exposed to the widely variant ranges of atmospheric temperature develop correspondingly greater tensile and compressive stresses in the continuous rails, due to the expansion and contraction of each line of rails as a whole. These stresses in the welded lines of rails might be kept within permissive limits if it were possible to effect the welding at certain mean temperatures, so that the highest degree of atmospheric temperature to be expected would be as much higher than the mean or average as the lowest degree of atmospheric temperature would be below the same mean or average. In the temperate zones, the highest temperature to be expected in unembedded railway tracks exposed to the direct rays of the summer sun is approximately 60° C. and the lowest temperature is about —20° C., so that variations due to a temperature range of approximately 80° C. must be taken into account. If it were possible to effect complete fusion welds of all of the rails at a temperature of 20° C., the exposed rails would never be heated to more than 40° C. above, or cooled to more than 40° C. below the temperature at which the welding was effected. The maximum actual expansion of complete fusion welds and longitudinal variations of the rails due to changes in temperature are represented by 40×22=880 kg. per sq. cm.; the factor 22 representing the stress in kilograms per square centimeter developed by a change of 1° C. in temperature.

In actual practice, however, it is impossible to carry out welding operations at any certain predetermined atmospheric temperature, because of the frequent and sometimes large variations in such temperature during the working period, so that it is practically impossible to effect the welding of long stretches or sections of railway rails to insure the continuous welded lengths keeping within the permissive stresses produced by the seasonal temperature variations.

The present invention is effective to overcome the difficulties by carrying out the welding operations at two separate periods, so that, during the first operation, only stretches of rails of limited lengths, say approximately 150 meters, are welded together, leaving joints between the successive stretches connected with the usual fish plates or other removable connections, until the second working period arrives. In carrying out the first operation, no particular attention need be given to atmospheric temperature conditions, for the reason that the temperature stresses set up in the respective stretches of welded rails will be within the permissive limits aforesaid. The second welding operation to join the rails of the successive stretches or sections, produced by the first operation, is carried out at a time when a mean atmospheric temperature prevails. As comparatively few welds of this kind are necessary, it is possible to carry out the work within a limited time under such mean temperature conditions. For example, if, during the first working period, stretches of ten rails each are welded together, there remain only 10% of the joints to be welded during the second welding period. During this second period, the spaces between the successive sections or stretches of previously welded rails are closed by a suitable weld or by being first filled with a proper length or section of rail of the correct profile, which will be joined to the continuous series of rails by suitable welds.

As in practical operation it may be found difficult or impossible to effect the welding of even the reduced number of joints between the successive stretches or sections of previously welded rails, during the prevalence of the desired mean atmospheric temperature, it will be found advantageous to apply to the rails adjacent the joints to be welded, at times when the temperature deviations from the desired mean or average are only slight, mechanical compressive or tensile stresses sufficient to compensate for the variations in the rails adjacent the joint due to such temperature variation from the mean. If, for example, the desired average temperature is 20° C. and the welding operation must be carried out at a temperature of 15° C., the tensile stress to be applied to the rails adjacent the joint is represented by $5 \times 22 = 110$ kg. per sq. cm. just before the welding of the rail ends at the joint is effected, under which conditions the rails will not expand at a temperature of 20° C.

The appropriate tensile and compressive stresses may be set up in the rails by means of suitable clamping devices, such as are now commonly used in alumino-thermic welding of rails, which clamps are fixed to each of the rails adjacent the ends thereof and connected by suitable means for either pulling the rail ends toward each other or forcing the same apart, thereby imparting a corresponding stress to the rails as a whole. Obviously, also compressive stresses may be set up in the rails preparatory to effecting the welding of the latter, by driving wedges between the adjacent rail ends. The amount of the tensile or compressive stresses to be mechanically applied to the rails depends upon the extent of the rail joint opening to be closed by the welding operation. When applying the clamping apparatus or the wedges, it will be necessary to secure the rails against longitudinal movement as a whole at various points by means of clamps, rail anchors or other suitable devices which may be properly connected to the cross ties.

What I claim is:

1. The method of uniting the rails of railways, which comprises welding together the ends of predetermined stretches of rails, leaving open joints between the successive stretches, and welding the intermediate joints under conditions of approximate mean atmospheric temperature.

2. The method of uniting the rails of railways, which comprises welding together the ends of predetermined stretches of rails, leaving open joints between the successive stretches, welding the intermediate joints under conditions of approximate means atmospheric temperature, and compensating the variations in the rails due to deviations from the mean temperature by the application of appropriate longitudinal stresses to the rails adjacent the said intermediate joints.

In testimony whereof I affix my signature.

JOHN WATTMANN.